Figure 1:
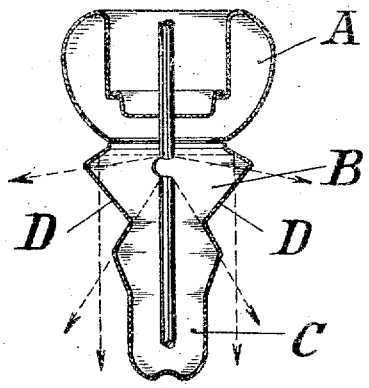
Figure 2:
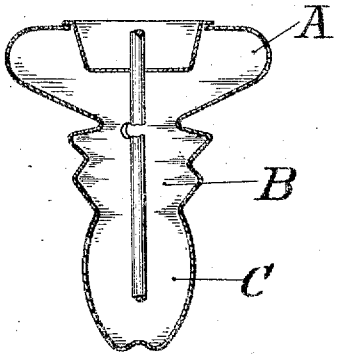
Figure 3:
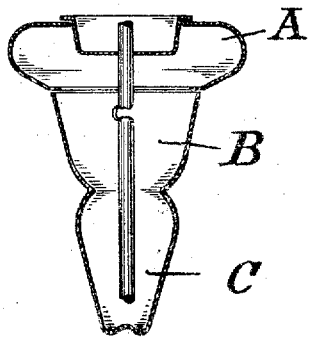
Figure 4:
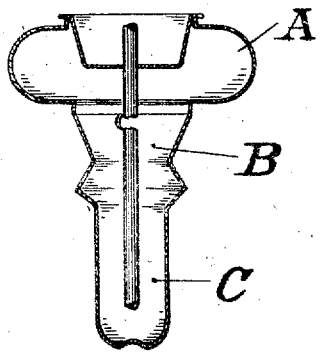

T. L. CARBONE.

ARC LAMP.

APPLICATION FILED MAY 15, 1913.

Reissued Sept. 23, 1913. 13,619.

Witnesses

Mary G. Brooks

Harry King

Inventor

Tels Livio Carbone

By Hoepel & Hoepel

Attorneys.

UNITED STATES PATENT OFFICE.

TITO LIVIO CARBONE, OF CHARLOTTENBURG, GERMANY.

ARC-LAMP.

13,619. Specification of Reissued Letters Patent. Reissued Sept. 23, 1913.

Original No. 975,935, dated November 15, 1910, Serial No. 484,552. Application for reissue filed May 15, 1913. Serial No. 767,921.

DIVISION B.

*To all whom it may concern:*

Be it known that I, TITO LIVIO CARBONE, a citizen of the Swiss Republic, residing at Charlottenburg, near Berlin, Germany, have invented certain new and useful Improvements in Arc-Lamps; and I do hereby declare the following to be a full, clear, and exact description of the invention, such as will enable others skilled in the art to which it appertains to make and use the same.

The present invention relates to arc lamps for long lighting hours and has the object of keeping clean the part of the globe from which the light mainly issues, especially in case of the employment of impregnated carbons.

The use of the flaming arc is connected with the disadvantage of requiring a globe or inclosure for the arc, and the vapors invariably given off by the flaming arc of impregnated or other carbons yield deposits which cloud the transparent walls and tend to obscure the arc. Attempts have been made to overcome this difficulty by utilizing the heat of the arc to set up a vigorous circulation of the gases at the interior of the globe by providing a more or less highly organized exterior circulatory system for the purpose of returning the gases which have been forced out at the top to the bottom of the globe. These gases carry the vapors away from the arc and deposit the condensation-products in the cooler parts of the circulatory system arranged to receive them outside of the arc-inclosing globe itself. In such attempts as have been made to carry out this arrangement, a number of difficulties have been encountered. For instance, some definite construction must be employed for the purpose of returning the gases downwardly from the arc to the lower end of the globe. These channels necessarily obstruct the arc more or less and prevent it from delivering its full illuminating effect, cutting down its efficiency and in some instances casting large shadows. These difficulties are independent of the complexity and elaborate structures that become necessary.

The object of the present invention is to eliminate these difficulties and attain the desired result in a more direct manner and by simpler and less expensive means.

As a result of much testing and experimental work, means were devised whereby the desired result may be accomplished and at the same time the circulatory system much simplified. The necessity of any outside duct or ducts for the return of the gases to the lower portion of the arc-space is dispensed with and the whole structure simplified by reducing the same to a single globe or inclosure which is provided with a plurality of chambers suitably connected. One embodiment of my invention which has given excellent results, has three such chambers arranged one above the other, the middle chamber being transparent and containing the arc, which chamber, for the best light emitting and distributing qualities, may be conical in shape with the walls preferably brought into more or less proximity to the arc, so as to better subserve the efforts of maintaining its surface free from deposits.

It is thought that the gases rising around the upper electrode are cooled in the upper chamber and fumes deposited therein and that the cooled gases flow along the outer part of the globe adjacent to the wall. The heat adjacent the arc would be sufficient to prevent the deposit of the fumes, but around the lower electrode the flow of gas would be slow enough to permit suspended particles to fall in the lower chamber.

Tests have been conducted with different makes of impregnated arc-carbons with uniform results,—the globe remaining clear for upward of 150 hours, and this with a single trim or supply of carbons. I have found that excellent results are obtained when a depositing space is provided both above and below. It was soon found that when one or both chambers were omitted, the deposit would encroach and would partially obscure the light-emitting wall surrounding the arc. As a means of securing a clear line of demarcation of the deposits and preventing their encroachment upon the transparent wall immediately surrounding the arc, a change of angle or inclination of the wall with respect to the arc or general alinement of electrodes is found effective, and an inner ridge or contraction will accomplish this result. Of course, a clear line of demarcation is not in all cases necessary, and any means of confining, to a greater or less extent, the deposits, will fulfil the conditions,—the necessary feature being an organization whereby the phenomenon of diffusion operates to carry the vapors produced at the arc away from the light-emitting wall before they are condensed and the oxids or other solids deposited.

The present invention consists in providing a separate chamber for the arc by forming a series of circular contractions in the globe, so that it is divided into several superposed chambers. By this device the heat of the arc is concentrated in the middle member, but at the same time the walls of the middle chambers are protected by their conical shape against decomposition and can therefore be arranged closer to the arc than was possible hitherto. The advantage of this arrangement is that no gases are condensed on the walls of the middle chamber inclosing the arc.

Figures 1 to 4 of the accompanying drawings show several different forms of globes according to my invention and it will be understood that the globe may take a great many different forms without departing from the spirit of the invention.

A, B, C are the three chambers inclosed by the contractions in the wall of the globe. These chambers may be made wholly of glass or partly of glass and partly of a suitable metal. It has been found by experiment that, with this arrangement, the condensed gases from the impregnated carbons are deposited only in the upper and lower chambers A and C, while the wall of the chamber B remains free from deposit and therefore transparent.

In Fig. 1 the part of the wall of the globe that is kept free of the condensed gases is marked D.

I claim:

1. In the art of electric lighting by inclosed arc lamps of long lighting hours producing condensable vapors that condense to opaque deposits, that step of preventing the condensation of the condensable vapors in that part of the inclosure through which the light mainly issues, which consists in concentrating the heat of the arc only at the region adjacent to the arc and in said part of the inclosure, for permitting the removal of the condensable vapors beyond said region and said part, before condensation thereof on that part of the globe from which the light mainly issues.

2. In the art of electric lighting by inclosed arc lamps of long lighting hours producing condensable vapors that condense to opaque deposits, that improvement in the art which consists in concentrating the heat of the arc only at the region adjacent the arc in that portion of the inclosure through which the light mainly issues, for permitting the removal of the condensable vapors beyond said region and said portion before condensation thereof, and then after such removal, condensing said vapors beyond said region.

In testimony that I claim the foregoing as my invention, I have signed my name in presence of two subscribing witnesses.

TITO LIVIO CARBONE.

Witnesses:
GEORGE W. GRAVES,
HARRY A. KINCHLEY.

Copies of this patent may be obtained for five cents each, by addressing the "Commissioner of Patents. Washington, D. C."